United States Patent [19]
Aschwanden

[11] Patent Number: 5,896,306
[45] Date of Patent: Apr. 20, 1999

[54] GROUP DELAY CORRECTION METHOD AND APPARATUS

[75] Inventor: Felix Aschwanden, Thalwil, Switzerland

[73] Assignee: RCA Thomson Licensing Corporation, Princeton, N.J.

[21] Appl. No.: 08/787,203

[22] Filed: Jan. 22, 1997

[30] Foreign Application Priority Data

Jan. 25, 1996 [GB] United Kingdom .................. 9601488

[51] Int. Cl.[6] .................................................. H04B 1/10
[52] U.S. Cl. ............................ 364/724.011; 375/350
[58] Field of Search ............................ 375/350, 231, 375/222, 371; 455/307

[56] References Cited

U.S. PATENT DOCUMENTS

| | | | |
|---|---|---|---|
| 4,792,964 | 12/1988 | Yoshida | 375/371 |
| 4,815,023 | 3/1989 | Arbeiter | 364/724 |
| 4,817,114 | 3/1989 | Boer et al. | 375/222 |
| 4,849,989 | 7/1989 | Kamerman | 375/231 |
| 5,050,186 | 9/1991 | Gurcan et al. | 375/14 |
| 5,155,742 | 10/1992 | Ariyavisitakul et al. | 375/12 |
| 5,182,530 | 1/1993 | Kelly et al. | 333/18 |
| 5,243,624 | 9/1993 | Paik et al. | 375/14 |
| 5,276,516 | 1/1994 | Bramley | 358/167 |
| 5,337,264 | 8/1994 | Levien | 364/724.01 |
| 5,416,799 | 5/1995 | Currivan et al. | 375/232 |
| 5,442,582 | 8/1995 | Lange et al. | 364/825 |
| 5,483,590 | 1/1996 | Chiu et al. | 379/269 |
| 5,521,499 | 5/1996 | Goldenberg et al. | 327/237 |
| 5,694,439 | 12/1997 | Doyle et al. | 375/350 |

OTHER PUBLICATIONS

"Linear Phase Filter Design on a Time–Domain Basis" Proceedings of the IEEE, vol. 69 No. 7 B. Philobos and Paul M. Chirlian, Jul. 1981.

Signal Processing Toolbox by J. Little and L. Shure, The Math–Works, Inc., pp. 1–15, 1–16, 1–17.

Digitale Signalverarbeitung und–simulation, Band 2, pp. 321–323 w/ translation of same (Digital Signal Processing and Simulation).

*Primary Examiner*—Ayaz R. Sheikh
*Assistant Examiner*—Omar A. Omar
*Attorney, Agent, or Firm*—Joseph S. Tripoli; Peter M. Emanuel; Robert D. Shedd

[57] ABSTRACT

A filtering method and apparatus in which an input signal is subjected to an analog filtering step, then an analog to digital conversion step and finally a digital filtering step to produce a filtered output signal. The pulse response of the digital filter is the mirror image of the pulse response of the analog filter and the cascaded filtering steps result in a filtered output signal which exhibits little or no group delay or phase distortion. The digital filter may be a FIR filter. Also disclosed is a phase error correction method whereby a pulse is inserted into a circuit or data stream prior to a group delay imparting device or function, a pulse response of the group delay imparting device or function is measured prior to a phase correcting device or function, mirror image filter coefficients are calculated using a window function and then incorporated into a phase correcting filter arrangement.

12 Claims, 3 Drawing Sheets

GROUP DELAY CORRECTION METHOD AND APPARATUS

FIELD OF THE INVENTION

This invention relates to signal processing arrangements generally and particularly to those signal processing arrangements which impart group delay errors to the processed signal.

BACKGROUND OF THE INVENTION

A "time reversal" filtering method is a method of filtering an input signal twice, once in the forward time direction and once in the reverse time direction. The first (forward) filter exhibits a first frequency-dependent magnitude response and a first frequency-dependent phase response. The frequency dependent phase response, or group delay, disadvantageously distorts phase dependent information components included within the input signal (e.g., audio or video information included within a television signal). To compensate for the distorting effect of the first (forward) filtering, a second (reverse) filter is cascaded with the first (forward) filter. The second (reverse) filter exhibits a second frequency-dependent magnitude response and a second frequency-dependent phase response. If the group delays of the two filters are complimentary, then the phase-distorting effect of the first filter is canceled by a "phase-restoring" effect of the second filter. This time reversal filter response advantageously provides minimum phase distortion of the filtered signal. In addition, the magnitude response of the time reversal filtered signal is the product of the magnitude of one of the forward and reverse filters.

A time-reversal filter is relatively easy to implement using a computer running the appropriate software. For example, the MATLAB™ computer program, including the Signal Processing Toolbox, from The Mathworks, Inc., includes a command "filtfilt" which will perform the above described forward and reverse filtering of a signal stored in a computer's memory. Unfortunately, if it is necessary to perform time-reversal filtering of a high-bandwidth signal in real-time then a dedicated hardware implementation becomes necessary.

An example of a prior art hardware implementation of a time-reversal filter is shown in FIG. 4 and includes an analog low pass filter (LPF), an analog to digital (A/D) converter, an infinite impulse response (IIR) filter, four last in first out (LIFO) memory arrangements and four switches (SW1-SW4). An input signal IN is filtered and digitized by the cascaded LPF and A/D converter, resulting in a "forward" filtered input signal. The forward filtered signal must now be "reverse" filtered by the IIR. The "time reversal" is accomplished by storing the forward filtered signal in the LIFO memory arrangement. When the forward filtered signal is read form the LIFO memory arrangement the more recent samples will be retrieved first, thus producing a "time reversed" forward filtered signal.

Unfortunately, since the LIFOs cannot hold an infinite amount of data the signal stream needs to be partitioned and reverse filtered by the IIR segment by segment. The segmenting is accomplished by using the four LIFOs as follows. In a first mode of operation all the switches are in the "1" position (as shown in FIG. 4), the first and third LIFOs are receiving and storing data while the second and fourth LIFOs are transmitting data previously stored (i.e., during a second mode of operation). In the second mode of operation all the switches are in the "0" position, the first and third LIFOs are transmitting data previously stored (i.e., during the first mode of operation) while the second and fourth LIFOs are receiving and storing data. A controller (not shown) controls the switches and LIFOs, thus causing the modes of operation to be alternated.

Disadvantageously, as a result of the segmented processing, the input signal stream is interrupted and signal corruption occurs at the segment boundaries. In a digital television system the segment length may be selected to be one horizontal line, thereby causing any boundary corruption to occur during the horizontal blanking interval. However, if the data stream to be filtered is continuous, such as an MPEG data stream (which has no blanking interval) or a communication channel, then alternate methods must be used. For example, an "overlap-add" technique may be used to help reduce the corruption. This technique requires considerable amount of hardware to store data beyond a segment boundary and re-integrate the data stream at the exact boundary segment. Moreover, the results of this technique are not always acceptable.

It is therefore desirable to implement a real-time filtering system which provides significantly reduced phase distortion, does not require segmentation of an input signal and does not require an excessive amount of hardware to implement.

SUMMARY OF THE INVENTION

The subject invention concerns a filtering method and apparatus in which an input signal is subjected to an analog filtering step, followed by an analog to digital conversion step and finally a digital filtering step to produce a filtered output signal. The pulse response of the digital filter is the mirror image of the pulse response of the analog filter and the cascaded filtering steps result in a filtered output signal which exhibits little or no group delay or phase distortion. The digital filter may be a FIR filter. The characteristics of the digital filter may be periodically updated by exciting the analog filter, measuring its pulse response and calculating new filter coefficients which, when utilized by the digital filter, cause the pulse response of the digital filter to be a mirror image of the pulse response of the analog filter.

BRIEF DESCRIPTION OF THE DRAWING

The invention will be described with reference to the accompanying Drawing, in which.

DETAILED DESCRIPTION

Figure 1:
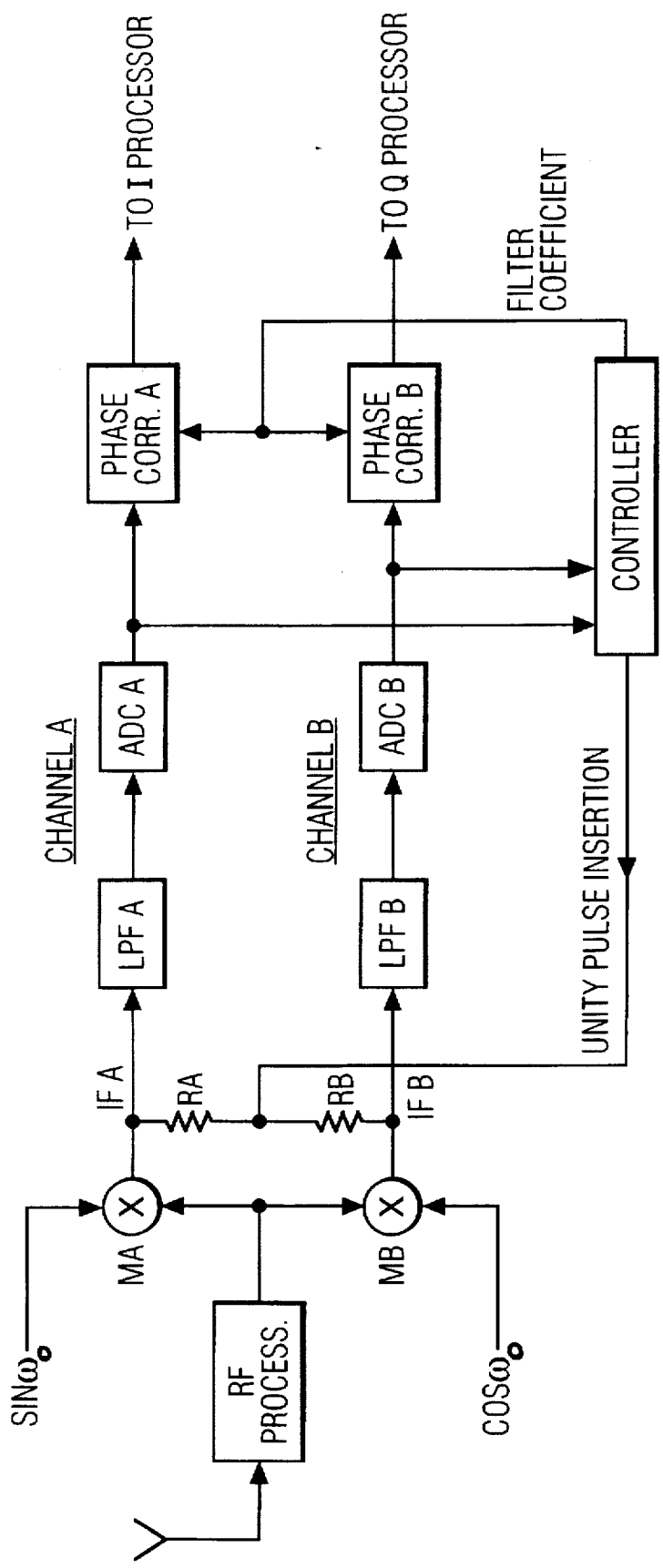
FIG. 1 a block diagram of a quadrature phase-shift keying (QPSK) demodulator including a filtering arrangement according to the invention.

FIG. 1 shows a block diagram of a "direct conversion" tuner in which a quadrature phase-shift keying (QPSK) demodulator is used to convert a radio frequency signal into in-phase (I) and quadrature-phase (Q) signals. The direct conversion tuner will be more fully described below. This type of receiver requires extremely sharp low pass filters (LPFs) after the quadrature mixers in order to suppress adjacent channels. Such filters tend to introduce considerable group delay distortion. Equalization of the phase-distorting effects of the LPFs is often critical to maintaining data integrity of the modulated signal. Such phase equalization, especially of a signal which cannot be readily segmented, is difficult to achieve using time reversal filters. As such, a new filter methodology suitable for filtering non-segmented signals without introducing phase distortion, phase is desirable. Such a filter is shown in FIG. 2 and incorporated into the QPSK receiver of FIG. 1.

The invention is directed toward the problem of group delay errors imparted to an information bearing signal or data stream by a group delay imparting device or function (i.e., error source) having a characteristic phase response. The characteristic phase response of the group delay imparting device or function may be determined by inserting a pulse into a circuit or data stream prior to the group delay imparting device or function. The pulse response of the group delay imparting device or function is measured prior to a phase correcting device or function, mirror image filter coefficients are calculated using a window function and then incorporated into a phase correcting filter arrangement. The group delay errors in the information bearing signal or data stream may be substantially reduced by subjecting the signal or data stream to a processing step having the mirror image phase response.

Figure 2:
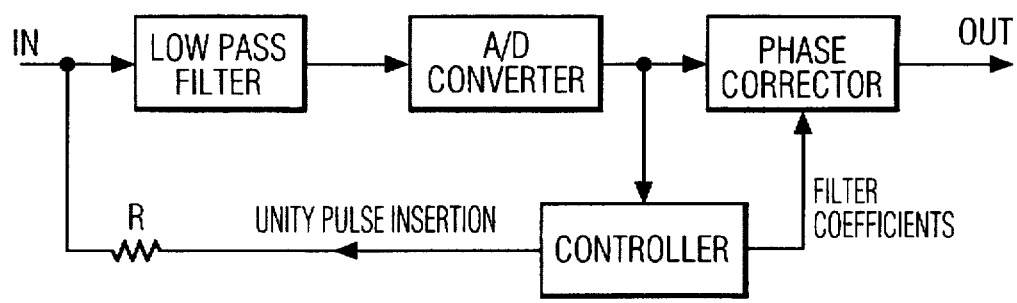
FIG. 2 is a block diagram of a filtering arrangement according to the invention and suitable for use in the QPSK demodulator of FIG. 1.

Referring to FIG. 2, a block diagram of a filtering arrangement according to the invention is shown. An input signal IN includes a carrier component and an information component modulated upon the carrier component. The input signal is received by an analog filter, illustratively a low pass filter having a characteristic gain response and a characteristic phase response. The analog filtered signal at the output of the LPF is coupled to a conventional analog to digital (A/D) converter. The A/D converter converts the analog-filtered signal into a data stream which is coupled to a phase corrector. Ideally, the phase response of phase corrector is the exact opposite (i.e., mirror image) of the phase response of the LPF. Such an ideal mirror image response has the desirable effect of exactly canceling any group delay imparted to the input signal by the analog filter. Advantageously, this mirror-image filtering method does not require segmentation of the input signal, thereby eliminating the boundary problem exhibited by the time reversal arrangement of FIG. 4. Note that waveforms C and D of FIG. 3 are graphical representations of, respectively, a normalized pulse response of an analog low pass filter (truncated) and a normalized mirror-image of the pulse response.

While a substantially ideal phase corrector may be constructed using an infinite impulse response (IIR) filter, such a filter tends to be complex and expensive. A finite impulse response (FIR) may also be used; however, some compromises must be made since an infinite pulse response from an FIR requires an infinite (or very large) number of taps. The inventor recognized that a reasonable compromise between the number of taps and the performance of the FIR phase corrector may be achieved by using a method which will now be described.

For the purpose of this discussion it is assumed that the analog filter of the filtering arrangement of FIG. 2 is an extremely sharp LPF. As an example, assume the LPF is a seven pole elliptical LC filter having a −3 dB cutoff frequency of 2.86 MHz, passband ripple of .3dB, a transition bandwidth of 440 KHz and a stop-band attenuation of 57 dB beginning at approximately 3.3 MHz. The elliptical filter also exhibits a group delay nonlinearity having a peak nonlinearity at the cutoff frequency of 2.86 MHz, typical of elliptical filters. This very sharp LPF is relatively inexpensive and has a characteristic gain response which makes the LPF suitable for use in the direct conversion receiver of FIG. 1. Unfortunately, the characteristic phase response of this filter causes group delay errors in the information component of the received signal IN.

Figure 3:
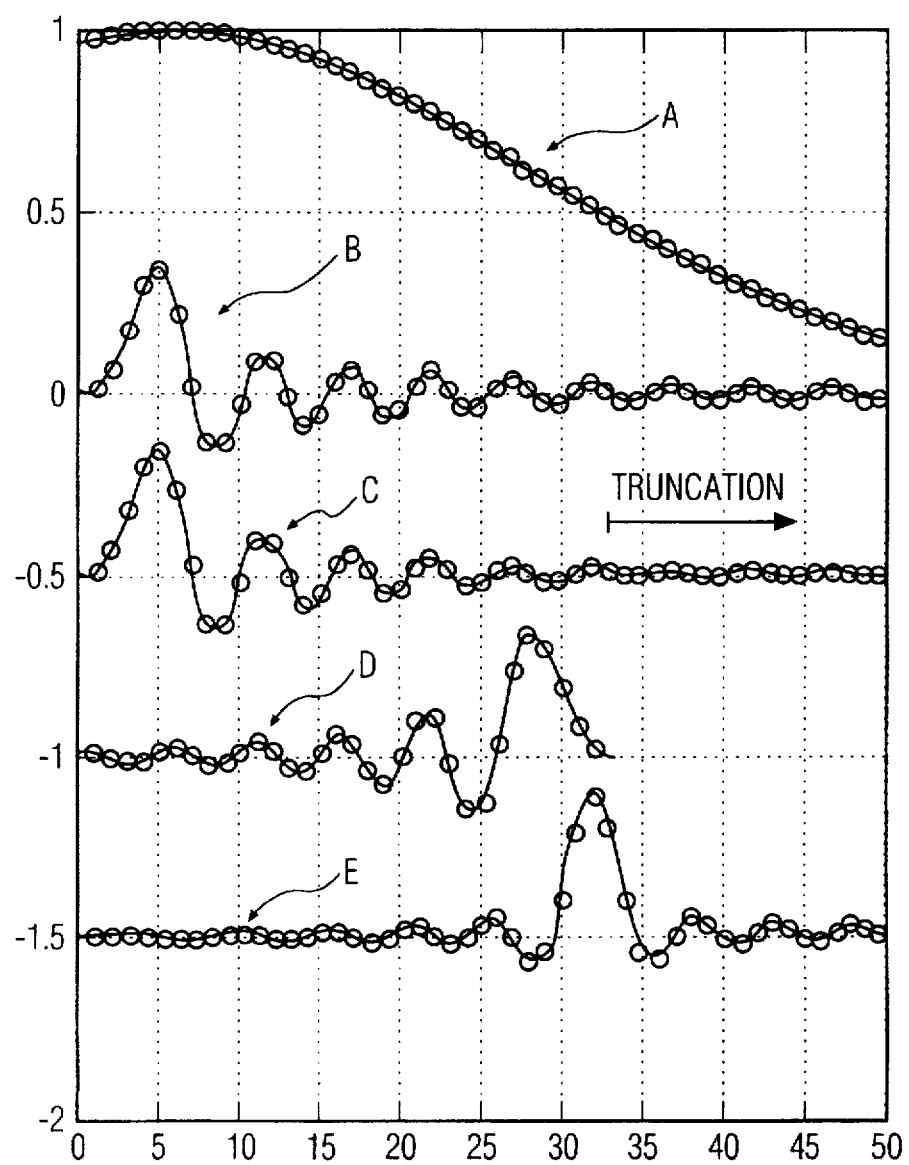
FIG. 3 is a graphical representation of several waveforms useful for understanding the invention.

FIG. 3 is a graphical representation of five waveforms (A, B, C, D and E) useful for understanding the invention. The horizontal axis corresponds to time and the vertical axis corresponds to amplitude. To clearly present the five waveforms in a single figure the third (C), fourth (D) and fifth (E) waveforms have been vertically offset from the first two waveforms by, respectively, −0.5 units, −1.0 units and −1.5 units.

The second waveform (B) of FIG. 3 is a graphical representation of a normalized time-domain pulse response of the analog low pass filter described above with respect to FIG. 2. As previously described, the horizontal axis is a measure of time and the vertical axis is a measure of amplitude variations of a filtered output signal resulting from an input pulse signal. The pulse response of the ideal phase corrector for the LPF of FIG. 2 is a mirror image of the pulse response of second waveform (B) at the vertical axis. Such a phase corrector may be realized by using an FIR having 140 taps. However, since a 140 tap FIR filter is quite complex it is desirable to reduce the number of taps by, e.g., windowing and truncation.

The first waveform (A) of FIG. 3 is a graphical representation of a normalized smoothing window, illustratively a modified Kaiser window, suitable for use in a filtering arrangement according to the invention. The modifications may be described graphically as truncating the left half of a normal Kaiser window and horizontally displacing the center of the remaining right half. The window interval includes most, but not all, of the pulse response information from the LPF (see waveform B).

The third waveform (C) of FIG. 3 is a graphical representation of the product of the first waveform (A) multiplied by the second waveform (B). Thus, the pulse response information from the analog filter which is within the window (i.e., time 0 up to time 33) is used to calculate the filter coefficients for the FIR phase corrector filter. The pulse response information from the analog filter which is outside of the window is multiplied by zero, i.e., truncated. In the exemplary embodiment this calculation is performed in the digital domain by, e.g., a mathematics program (e.g., MATLAB™) operating in a microprocessor, microcontroller or other computing device (e.g., digital signal processor). The third waveform (C) clearly shows a substantial reduction in the residual amplitude components (i.e., ringing) due to the windowing function. This reduction is superior to that which may be achieved using simple truncation (i.e., a rectangular window function) since simple truncation would leave higher amplitude components near the zero multiplication, or truncation point.

Figure 4:
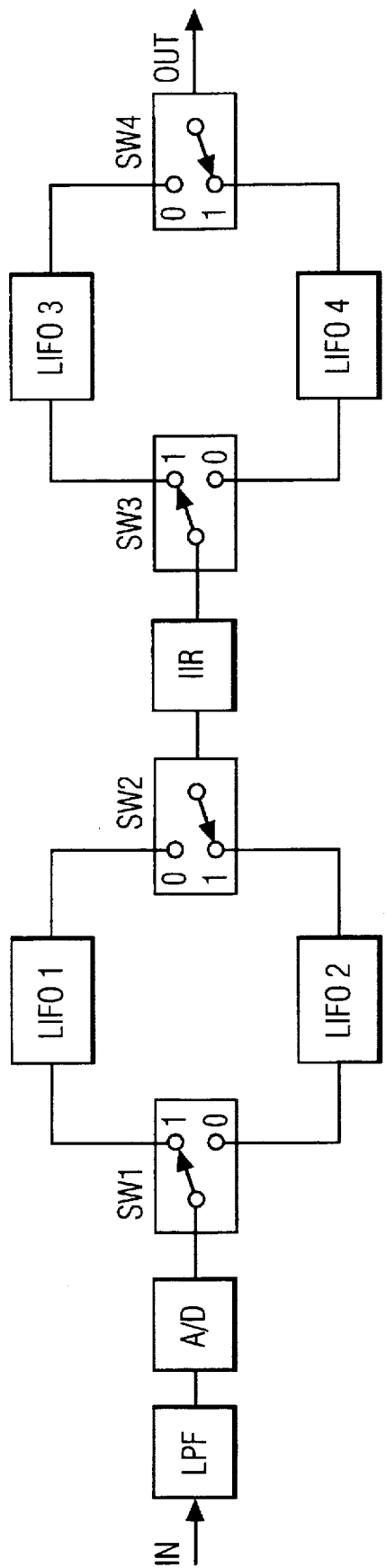
FIG. 4 is a block diagram of a prior art time reversal filter.

The fourth waveform (D) of FIG. 3 is a graphical representation of the mirror image of the third waveform (C). Note that the mirror image of the "truncated" portion of the third waveform (D) is not shown. The above-described windowing method allows for greater truncation of the number of taps used by the FIR filter of the phase corrector. While acceptable performance utilizing only 32 taps is made possible by this method, the invention may be practiced using a greater or lesser number of taps. The discrete component of the fourth waveform (D) of FIG. 4 depicts the normalized pulse response of a 32-tap FIR filter suitable for use as a phase corrector for the above-described analog LPF. It was experimentally determined that a 40 tap filter would provide very little improvement over the 32 tap filter. However, if less than approximately 28 taps are used then the performance of the phase corrector rapidly drops.

The fifth waveform (E) of FIG. 3 is a graphical representation of a normalized pulse response of the above-described analog low pass filter cascaded with the above-described FIR phase corrector filter. The overall pulse response is fairly symmetrical, though the effect of the truncation can clearly be seen. Note that the right side of the response plot approaches zero more slowly than the left side of the response plot. A filter having an almost symmetrical pulse response has a low group delay or phase distortion characteristic. In this case the overall response results in an overall phase response which is substantially flat up to about 2.7 MHz, which includes 95% of the analog filter passband. Thus, the filtering arrangement produces an output signal OUT in which the phase distortion or group delay errors imparted to the input signal IN by the LPF have been substantially corrected by the phase corrector.

The filter coefficients may be calculated using a method such as the following. First, a portion of the data stream, e.g., the discrete data points of waveform B, is received by the controller and stored in a memory arrangement as a sample data set having a plurality of data elements corresponding to discrete data samples. The stored sample data set is then multiplied by a smoothing function, such as the modified Kaiser function depicted in waveform A. The product of this multiplication is a data set having a plurality of data elements which correspond to the discrete data samples of waveform C. The product data set is then truncated to, e.g., 32 data elements. The positions of the data elements within the data set are then mirror imaged. That is, the first and 32nd data elements are switched, the second and 31st data elements are switched, etc. The resulting mirror image data set is now used to derive the filter coefficients for the FIR phase correction filter.

The filter coefficients of the FIR phase corrector filter are determined by the type of analog filter used (i.e., high pass, low pass, band pass etc.) and the inherent stability of the analog filter. For example, in the case where an exceptionally stable filter is used it may be necessary to calculate or empirically determine the phase response of the filter only once. However, the components used in the analog filter are usually subject to drift and aging problems which are not easily compensated for. For example, capacitors may change value as they age or as the ambient operating temperature changes. As such, the characteristics of the filters, including any phase distortion, will change with, e.g., time and temperature.

To properly compensate for changes in filter characteristics the phase corrector must also be adjusted. This adjustment is made by periodically measuring the pulse response of the analog filter and recalculating the filter coefficients used by the phase corrector. The filter adjustment process will now be described using the previous LPF filter as an example.

Referring to FIG. 2, a unity pulse is generated by a controller and coupled to the analog LPF by a resistor R. The unity pulse may be coupled to the LPF when, e.g., the input signal IN is either not present or rendered non-interfering by switching or other means (not shown). The analog filtered signal at the output of the LPF is digitized by the A/D converter (see FIG. 3, waveform B). The digital data stream is coupled to the controller, which then calculates the filter coefficients. The calculated filter coefficients are then coupled to the phase corrector. By periodically performing this filter adjustment process the performance of the filtering arrangement may be maintained over time and temperature. For example, the process may be performed each time the unit is powered up, after a specific change in temperature has been measured by the controller (e.g., ±15° Celsius) or after a certain amount of time has elapsed.

Referring now to FIG. 1, the above-described filtering method will now be discussed in the context of a QPSK receiver operating according to the direct conversion principle. That is, the QPSK receiver of FIG. 1 demodulates a signal from the RF domain into baseband I and Q signals. There are no image responses because the frequency of the conversion stage is located within the spectrum of the desired RF signal. In addition, the very low frequency range of the signal produced at the output of the conversion stages makes it possible to readily provide sharp filters which can readily reject adjacent signal in the I and Q channels. Unfortunately, such sharp LPFs introduce a large amount of group delay distortions which increase, e.g., the bit error rate or symbol error rate of a received signal QPSK signal. The group delay distortions may make proper decoding of the received signal by subsequent processing stages impossible.

In the QPSK receiver of FIG. 1, low pass filters LPF A and LPF B, A/D converters ADC A and ADC B, phase correctors PHASE CORR. A and PHASE CORR. B, resistors RA and RB and a controller CONTROLLER operate in substantially the same manner as described above with respect to FIG. 2. Thus, the overall group delay distortions are canceled in substantially the same manner as described above with respect to FIG. 2.

Two quadrature local oscillator signals expressed as $\sin\omega_0$ and $\cos\omega_0$ and are applied to, respectively, mixers MA and MB. Mixer MA produces a channel A intermediate frequency (IF) signal IF A while mixer MB produces a channel B IF signal IF B. Each of the IF signals IF A and IF B includes a respective double frequency term (i.e., $2\omega_0$) as a consequence of the demodulation process. The purpose of the low pass filters LPF A and LPF B is to eliminate these double frequency terms and, as previously discussed with respect to FIG. 2, to suppress adjacent channels. The purpose of the phase correctors PHASE CORR. A and PHASE CORR. B is to reduce the group delay distortion introduced into the remaining (i.e., pass-band) frequency terms.

It will be apparent to those skilled in the art, that although the invention has been described in terms of specific examples, modifications and changes may be made to the disclosed embodiments without departing from the essence of the invention.

For example, the invention has been described in terms of a phase corrector which operatively compensates for group delay error imparted to a signal by an analog low pass filter. The error could also have been caused by a digital low pass filter, an analog high pass filter, etc. It must be noted that the shape of the window may be adapted for use with other types of filters (e.g., more or less sharp LPFs, high pass filters, band pass filters, etc.). The window function selected was a Kaiser window although there are a number of window functions which will provide suitable results. Moreover, depending upon the relative complexity of the group delay error imparted to the signal by the error source, the number of taps and, therefore, filter coefficients required by the phase corrector may be more or less than 32.

Finally, it must be understood that the invention is directed to the broader problem of group delay errors, regardless of the source of the error. The invention may be practiced by inserting a pulse into a circuit prior to a group delay imparting device, measuring a pulse response prior to a phase correcting device, calculating phase correcting filter coefficients using a window function and incorporating the coefficients into a phase correcting filter arrangement. Moreover, a signal other than a pulse may be used to produce a response characteristic of the group delay imparting device.

These and other modifications are intended to be within the scope of the present invention defined in the following claims.

What is claimed is:

1. A signal processing method comprising the steps of:

receiving an analog input signal;

processing said analog input signal using an analog filter to produce a filtered signal, said analog filter having an associated phase characteristic; and converting said filtered signal to a digital data stream using an analog to digital converter; and processing said digital data stream using a digital filter to produce an output signal, said digital filter having an associated phase characteristic which is substantially the mirror image of the phase characteristic associated with said analog filter.

2. The signal processing method of claim 1 further comprising the steps of:

injecting a pulse signal into an input of said first processing means;

measuring the response of said first processing means to said pulse signal;

calculating a mirror image of said response of said first processing means to said pulse signal;

calculating finite impulse response filter coefficients using a portion of said calculated mirror image;

utilizing said calculated coefficients in said digital filter, said digital filter being a finite impulse response filter.

3. The signal processing method of claim 2 wherein:

said filter coefficients are calculated using a smoothing function; and said portion of said calculated mirror image is within the right half of said smoothing function.

4. The signal processing method of claim 3 wherein:

said smoothing function is a modified Kaiser window.

5. A phase error correcting method comprising the steps of:

receiving an input signal having a group delay error caused by a first signal processing means, said first processing means having an associated phase characteristic;

processing said input signal using a digital filter to produce an output signal, said digital filter having an associated phase characteristic which is substantially the mirror image of the phase characteristic associated with said first processing means;

injecting a pulse signal into an input of said first signal processing means;

measuring the response of said first signal processing means to said pulse signal;

calculating a mirror image of said response of said first signal processing means to said pulse signal; and adjusting said digital filter in response to said calculated mirror image.

6. The phase error correcting method of claim 5 wherein said adjusting of said digital filter comprises the steps of:

calculating finite impulse response filter coefficients using a portion of said calculated mirror image;

utilizing said calculated coefficients in said digital filter, said digital filter being a finite impulse response filter.

7. The phase error correcting method of claim 6 wherein:

said filter coefficients are calculated using a smoothing function; and said portion of said calculated mirror image is within the right half of said smoothing function.

8. The phase error correcting method of claim 7 wherein:

said smoothing function is a modified Kaiser window.

9. Phase correction apparatus, comprising:

means for receiving an information signal having a group delay error caused by a first signal processing means, said first signal processing means having an associated phase characteristic;

digital filter means for filtering said information signal to produce an output signal, said digital filter means having a phase characteristic which is a substantially mirror image of said phase characteristic of said first signal processing means, said output signal produced by said digital filter means exhibiting a substantially reduced group delay error; and wherein said first signal processing means comprises analog filtering means for filtering an input signal;

said digital filtering means comprises analog to digital converter means coupled to said analog filtering means for converting an analog filtered input signal to a digital data stream.

10. The phase correcting apparatus of claim 9, wherein:

said digital filter is a finite input response filter.

11. The phase correcting apparatus of claim 10, further comprising:

means for injecting a pulse signal into an input of said first signal processing means;

means for measuring the response of said first signal processing means to said pulse signal;

means coupled to said measuring means for calculating a mirror image of said response of said first signal processing means to said pulse signal and for calculating finite impulse response filter coefficients using a portion of said calculated mirror image; and means for providing said calculated coefficients to said digital filter.

12. The phase correcting apparatus of claim 11, wherein:

said calculating means utilizes a smoothing function to produce said filter coefficients.

* * * * *